United States Patent Office.

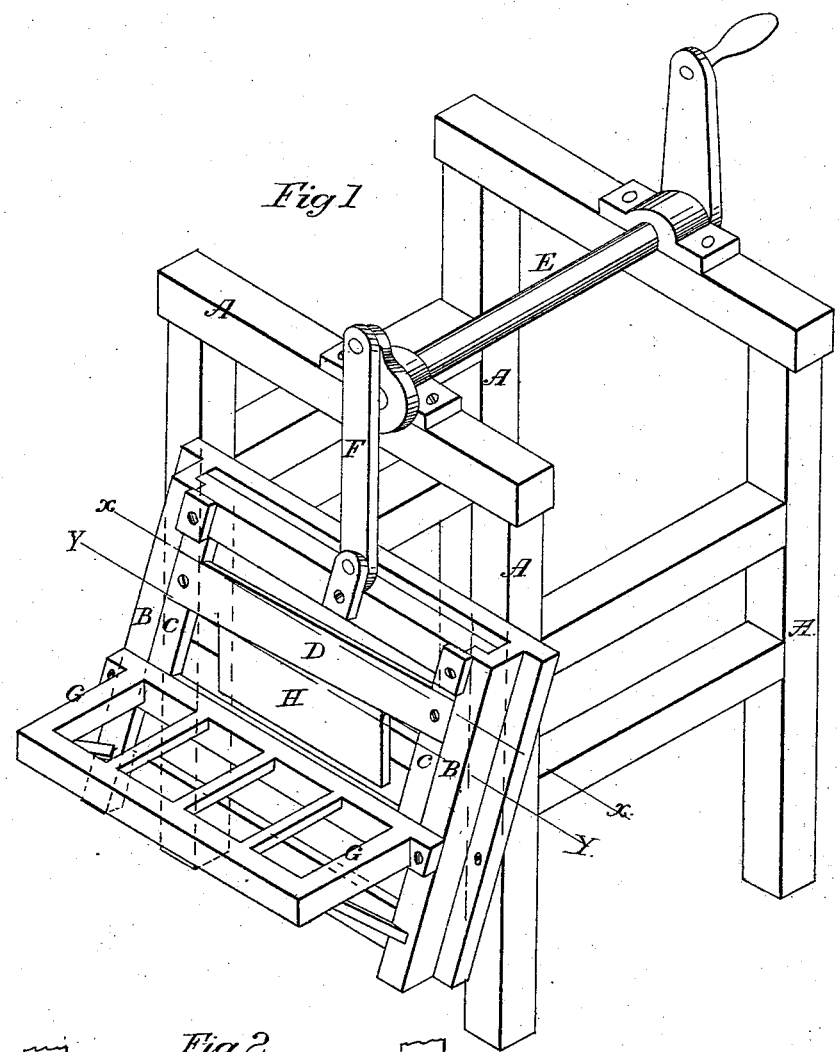
H. D. Barnes,
Cutting Shingles.
Nº 61,503. Patented Jan. 29, 1867.
Fig 1.
Fig 2. Fig 3.
Fig 4.
Witnesses: 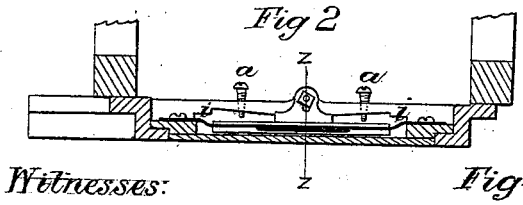
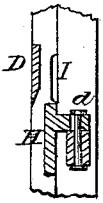
Inventor: 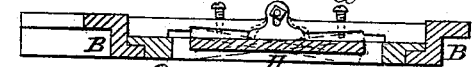

HENRY D. BARNES, OF NEW HAVEN, CONNECTICUT.

Letters Patent No. 61,503, dated January 29, 1867.

IMPROVEMENT IN SHINGLE MACHINES.

*The Schedule referred to in these Letters Patent and making part of the same.*

TO ALL WHOM IT MAY CONCERN:

Be it known that I, HENRY D. BARNES, of Fair Haven, in the county of New Haven, and State of Connecticut, have invented a new Improvement in Shingle Machine; and I do hereby declare the following, when taken in connection with the accompanying drawings and the letters of reference marked thereon, to be a full, clear, and exact description of the same, and which said drawings constitute part of this specification, and represent, in—

Figure 1, a perspective view; and in

Figures 2, 3, and 4, detached parts.

This invention, though termed a shingle machine, is applicable to the cutting of lath, veneers, &c., and consists in the peculiar arrangement of the cutter with the adjustable guide, which governs the thickness of the cut.

To enable others skilled in the art to construct and use my improvement, I will proceed to describe the same, as illustrated in the accompanying drawings.

A A is the framework, supporting, in inclined guides, B, a carriage, C, to which the cutter D is attached. The said carriage is moved up and down in the said guides by the application of power to the driving-shaft E, through the connecting-rod F; G is a platform fixed to the guides B, or otherwise to the framework upon which the material to be cut is placed. The cutter D, as will be seen in fig. 1, is set so that its edge is inclined, that is to say, higher at one end from the platform than the other; this, in connection with the inclination of the guides, gives to the cutter a drawing cut. Upon the carriage C, and back of the cutter, is fixed the adjustable guide H, adjustable upon a pivot at $d$, so as to turn to the right or left, as denoted in red and blue, fig. 3; the distance of this "swing" is regulated by the screws $a$.

The operation for cutting shingles is as follows: The block from which the shingles are to be cut is placed upon the platform G, and pressed against the guide H, and that end of the block, say at the right hand, is pressed so as to turn the guide into the position denoted in blue, fig. 3; then, as the cutter comes down, the shingle is cut in proper shape from the block; and when the cutter is again raised, press upon the block so as to turn the guide to the position denoted in red, fig. 3, and the second shingle will be cut, and so on, alternately pressing first the one end, and then the other, until the block is consumed. Or if it is desired to cut of a constant even thickness, turn both the screws $a$, so as to hold the guide in the desired fixed position, say as denoted in black, fig. 3. And for different thicknesses, the support of the guide is slotted, so as to slide back and forth upon the pivot $d$, and be fixed at that point. Back of the cutter, and to the carriage, is fixed a spring, I, and between which and the cutter the shingle or thing cut passes, and is held until the cutter rises and descends to cut the second, when the second forces out the first. This is important in order to keep the machine clear between the block and the guide. By this arrangement, it will be seen that the machine is very much simplified, as all necessity of "dogging" the block is dispensed with, and no more time is required in attending the machine than in automatic feeding, as all machines require constant attendance of one or more persons; but a saving of time is made in my machine, both in introducing the block, and in rapidity of operation.

Having therefore thus fully described my invention, what I claim as new and useful, and desire to secure by Letters Patent, is—

The combination of the cutter D and the adjustable guide H and the spring I, constructed and arranged to operate substantially in the manner described.

HENRY D. BARNES.

Witnesses:
JOHN H. SHUMWAY,
A. J. TIBBITS.